(12) United States Patent
Aguirre et al.

(10) Patent No.: US 8,075,986 B2
(45) Date of Patent: Dec. 13, 2011

(54) OPAQUE FILMS FOR USE IN PACKAGING

(75) Inventors: Juan Aguirre, League City, TX (US); Mark Miller, Houston, TX (US)

(73) Assignee: Fina Technology, Inc, Houston, TX (US)

(*) Notice: Subject to any disclaimer, the term of this patent is extended or adjusted under 35 U.S.C. 154(b) by 0 days.

(21) Appl. No.: 12/536,128

(22) Filed: Aug. 5, 2009

(65) Prior Publication Data
US 2010/0003494 A1   Jan. 7, 2010

Related U.S. Application Data

(63) Continuation of application No. 10/949,659, filed on Sep. 23, 2004, now abandoned.

(51) Int. Cl.
*B32B 27/32* (2006.01)
*B32B 7/12* (2006.01)

(52) U.S. Cl. ............ 428/220; 428/317.3; 428/319.9; 428/343; 428/355 EN; 428/500; 428/702; 428/704

(58) Field of Classification Search ............ 428/34.1, 428/34.2, 35.7, 36.5, 343, 352, 354, 355 R, 428/355 EN, 411.1, 500, 507, 515–521, 523, 428/220, 317.3, 319.9, 702, 704
See application file for complete search history.

(56) References Cited

U.S. PATENT DOCUMENTS

| | | | |
|---|---|---|---|
| 6,750,284 B1 * | 6/2004 | Dharmarajan et al. | 524/515 |
| 7,294,681 B2 * | 11/2007 | Jiang et al. | 526/348.2 |
| 7,553,528 B1 * | 6/2009 | Biddiscombe | 428/35.7 |

* cited by examiner

*Primary Examiner* — Walter B Aughenbaugh

(57) ABSTRACT

An opaque polymer film is prepared by admixing high crystalline polypropylene with a microvoid causing filler and extruding to form a sheet that is then biaxially stretched to form an opaque film. End uses for these films include soda bottles, candy wrappers and synthetic paper.

7 Claims, 4 Drawing Sheets

OPAQUE FILMS FOR USE IN PACKAGING

CROSS-REFERENCE TO RELATED APPLICATIONS

This application claims the benefit of U.S. patent application Ser. No. 10/949,659, filed Sep. 23, 2004, now abandoned.

BACKGROUND OF THE INVENTION

1. Field of the Invention

The present invention relates to polymer films. The present invention particularly relates to polypropylene films useful in packaging applications.

2. Background of the Art

Polypropylene and polyethylene films are commonly used as packaging materials. Applications for such materials include use as labels for plastic containers such as shampoo and soft drink bottles, and plastic bags and wrappings such as those used for candy and other food items. Labels produced from polypropylene or polyethylene films are desirable because they are clear and extremely thin films, thus providing a look that is similar to silk-screening on the surface at a much lower cost. The polypropylene or polyethylene labels impart a clear, no label appearance to the plastic bottle. Polypropylene and polyethylene films used in these applications typically have a thickness of approximately 1.1 to 3.2 mils (27.9 to 81.3 micrometers) and can become easily deformed. Often, they are used in conjunction with one or more substrate materials.

Polyolefin films can be prepared as opaque films rather than just as transparent films. In some applications, opacity is a desirable property for such packaging films. Opacity can protect materials from being degraded by light. For example, packaged foodstuff can be subject to deterioration caused by exposure to light, particularly light having a wavelength of up to about 450 nm. Even when a degree of opacity is present in the film, spoilage may occur if the film allows passage of too much light, therefore highly opaque films are the most desirable for these purposes.

Another advantage of opaque films is that they can be used as a background for transparent labels. Opaque films are not always the most desirable of surfaces for printing. It is known in the art of preparing, for example, food wrappers to print a label on a transparent film and laminate or coextrude that film with an opaque film so that the label is displayed against an opaque background.

Typically, such opaque polymeric packaging films are multi-layer films which comprise an opaque, thermoplastic polymeric core layer having one or more skin layers thereon. The skin layers contribute various desirable characteristics to the packaging film such as heat sealability, improved appearance, printability or enhanced machine handling capabilities and the like.

SUMMARY OF THE INVENTION

In one aspect, the present invention is an opaque biaxially oriented polymer film. The opaque biaxially oriented polymer film is prepared from high crystalline polypropylene wherein the opaque biaxially oriented polymer film has a thickness of less than 1.25 mil (32 micrometers).

In another aspect, the present invention is a label wherein the label is made using an opaque biaxially oriented polymer film prepared from high crystalline polypropylene and the opaque biaxially oriented polymer film has a thickness of less than 1.25 mil (32 micrometers).

In still another aspect, the present invention is a packaging material prepared using an opaque biaxially oriented polymer film prepared from high crystalline polypropylene and the opaque biaxially oriented polymer film has a thickness of less than 1.25 mil (32 micrometers).

Another aspect of the present invention is an opaque biaxially oriented polymer film prepared from high crystalline polypropylene wherein the opaque biaxially oriented polymer film has a density of less than 0.55 g/cm$^3$.

BRIEF DESCRIPTION OF THE DRAWINGS

For a detailed understanding and better appreciation of the present invention, reference should be made to the following detailed description of the invention and the preferred embodiments, taken in conjunction with the accompanying drawings, wherein.

DETAILED DESCRIPTION OF INVENTION

Figure 1:
FIG. 1 is a scanning electron microscope (SEM) photomicrograph of a cross section of an opaque film prepared using a conventional polypropylene resin.

High crystalline polypropylene is generally an isotactic configuration of polypropylene, often referenced using the term "i-PP." The degree of crystallinity is an important parameter for establishing relationships between final product structure and mechanical strength, optical and thermal properties, and also for quality control and product specification. Solid state NMR remains the predominant method for absolute measurement of the crystallinity index in polypropylene. Therein, the percentage of isotactic pentads can be determined and the degree of crystallinity ascertained. As an alternative, the degree of crystallinity, average crystallite size and the extent of crystal lattice disorder can be determined using wide angle x-ray diffraction. Another way to correlate crystallinity can be determined by measuring the xylene solubles content of the resin.

The crystalline polypropylenes useful with embodiments of the present invention are crystalline polymers comprising propylene as the main monomer unit. Included in this group are crystalline propylene homopolymers with or without including a nucleated agent. These polypropylenes may be obtained using either Ziegler-Natta or metallocene catalysts.

Regardless of how the degree of crystallinity of the high crystalline polypropylene is measured, the polymers will have certain properties, the presence of which can be used to differentiate high crystalline polypropylenes that can be used with embodiments of the present invention from those polymers that cannot. For embodiments where the high crystalline polypropylenes are obtained using a Ziegler-Natta catalyst, the high crystalline polypropylene can have a melting point of from about 155° C. to about 170° C. For the purposes of the present invention and for this and any other range of this application, expressly included in this range is any pair of points within the range. For example, the range of about 156° C. to about 169° C. is expressly included in the present invention. The high crystalline polypropylenes can have a heat of fusion of at least 100 joules/g. In another embodiment, the high crystalline polypropylenes can have a heat of fusion of at least 115 joules/g. In still another embodiment, the high crystalline polypropylenes can have a heat of fusion of at least 120 joules/g. In another embodiment, the high crystalline polypropylenes can have a heat of fusion of at least 125 joules/g. The high crystalline polypropylene has a recrystallization temperature of from about 105° C. to about 125° C. These properties are determined using a differential scanning calorimeter (DSC). For example, the heat of fusion properties can be determined using ASTM D-3417-99. The melting point and recrystallization ranges of the high crystalline polypropylenes useful with the present invention can be determined using a DSC method wherein a 5 to 10 mg sample is heated and cooled at a rate of 10° C./min. Any Ziegler-Natta derived polypropylene having these properties is a high crystalline polypropylene for the purposes of the present invention.

For embodiments of the present invention where the high crystalline polypropylenes are obtained using a metallocene catalyst, the high crystalline polypropylene will have a melting point of at least about 145° C. The metallocene derived high crystalline polypropylenes useful with the present invention can have a heat of fusion of at least 70 joules/g. The metallocene derived crystalline polypropylene useful with the present invention has a recrystallization temperature of from about 100° C. to about 115° C. These properties are also determined using a differential scanning calorimeter (DSC). Any metallocene derived polypropylene having these properties is a high crystalline polypropylene for the purposes of the present invention. Exemplary high crystalline polypropylene useful with the present invention include ATOFINA 3270 polypropylene, ATOFINA EOD01-30 metallocene polypropylene, Amoco 9117, Yuhwa Polypro HF5003 from Korea Petrochemical Ind, Co, Ltd, and also Chisso HF 5010 and Chisso XF 2805 from Chisso Chemical Co. Ltd., Tokyo, Japan. The high crystalline polypropylene, no matter whether prepared using a metallocene, Ziegler-Natta, or other catalyst, will also have an isotactic index of at least 97 percent.

In embodiments of the present invention, a polymer film is a biaxially oriented polymer film. A biaxially oriented film is generally prepared by taking a sheet of polymer and stretching it in two directions. Methods of accomplishing this are well known in the art of preparing polymer films. For example, U.S. Pat. No. 4,679,283 to Forrest, Jr., et al., which is incorporated herein in its entirety, discloses a device for biaxially stretching film. Generally, this process requires maintaining the polymer sheet at a temperature wherein the polymer is soft enough to be stretched, but not so soft that the polymer loses all structural integrity. Generally these devices work by feeding the polymer sheet through a heater and then accelerating the rate that the polymer sheet is moved forward while simultaneously stretching the sheet in the direction perpendicular to the direction that the polymer sheet is being moved forward. Any method of biaxially orienting a polymer film that is known to those of ordinary skill in the art of preparing polymer films to be useful can be used to prepare the films of the present invention.

The films of the present invention are opaque. For purposes of the present invention, the term opaque film means a film whose light transmittance, as tested according to ASTM D1003-00, is less than 50 percent due to the presence of microvoids. In another embodiment, the light transmittance is below 70 percent due to the presence of microvoids. In still another embodiment, the light transmittance of the films of the present invention is below 80 percent due to the presence of microvoids.

The microvoids in the films of the present invention are incorporated therein by any method know to be useful to those of ordinary skill in the art of preparing opaque polymer films. For example, in one embodiment, a microvoid inducing filler is compounded into the high crystalline polypropylene polymer directly. In another embodiment, the microvoid inducing filler is first compounded with a small amount of polymer to form a master batch that is then used to compound with high crystalline polypropylene polymer to form a resin that can be used to prepare the films of the present invention. Any such method can be used with the current invention.

Any material that has a higher melting point and is incompatible with high crystalline polypropylene film can be used as the microvoid inducing fillers to prepare the films of the present invention. For the purposes of the present invention, the term incompatible means that the material or polymer is in the form of a separate particle or a separate phase in the film. In order to create voids having a volume and geometry that, after stretching, produce opacity, the fillers have a particle size of from about 0.5 to about 10 micrometers. In another embodiment, the fillers have a particle size of from about 1.0 to about 7 micrometers. In still another embodiment, the fillers have a particle size of from about 1.5 to about 5 micrometers.

In one embodiment, the microvoid inducing filler is an inorganic solid. The inorganic solid fillers can be selected from aluminum oxide, aluminum sulfate, barium sulfate, calcium carbonate, magnesium carbonate, silicates such as aluminum silicate (kaolin clay) and magnesium silicate (talc), silicon dioxide, titanium dioxide, and mixtures thereof. An embodiment of the present invention includes a film prepared with calcium carbonate used as a microvoid inducing filler.

The microvoid inducing fillers can be incorporated into the high crystallinity polypropylene resin using any method known to be useful to those of ordinary skill in the art of preparing resins for casting polymer sheets for using making films. For example, the filler can be combined with polypropylene pellets and then reextruded into pellets. In another embodiment, the filler can be combined with polypropylene fluff and then further processed into pellets.

The opaque polymer films of the present invention can have several properties that can be commercially useful. In one embodiment, the opaque polymer films of the present invention have a lower density than films prepared with other types of polypropylene. For example the polymer films of the present invention can have a density of from about 0.44 g/cm$^3$ to about 0.60 g/cm$^3$. In another embodiment, the polymer films of the present invention can have a density of from about 0.48 g/cm$^3$ to about 0.52 g/cm$^3$. This density is significantly less than that for a film produced with similar non-crystalline polypropylene resins. The lower density means that less of the expensive resin can be used to prepare film thus lowering the material costs of the film.

Another excellent property of the films of the present invention is toughness. The opaque polymer films of the present invention can have an apparent toughness of from about 10 to about 14 mPa according. Calculations of tensile toughness are based on the area under the stress-strain curve. This differs from the traditional definition of tensile toughness because traditionally the value being reported is tensile toughness at break. The Karo IV tensile toughness values are tensile toughness at test end, regardless if the sample breaks or stretches. This property can be advantageous in applications where an opaque film of the present invention is used as part of a package. The additional toughness, as compared to a similar film prepared with, for example, a conventional rather than a high crystalline polypropylene, could help prevent tearing or punctures of the package.

The opaque films of the present invention retain a surprising amount of barrier property notwithstanding the amount of microvoids present in the films. While not primarily a vapor barrier material, the opaque polymer films of the present invention can functions as such in some applications. For example, the films of the present invention have a water vapor transfer rate that is nearly the same as that of conventional polypropylene.

The opaque polymer films of the present invention, can be prepared with additional pigments to either increase their optical density or change their color for aesthetic purposes. Any pigment that can be used with polypropylene films can be used with the opaque polymer films of the present invention. For example, $TiO_2$ is used to prepare an opaque polymer film in one embodiment of the present invention. Pigments of any color can be used with the present invention.

In addition to pigments, other additives can be used with the present invention. Suitable such conventional additives include, by way of example, antioxidants, orientation stress modifiers, flame retardants, antistatic agents, antiblock agents, antifoggants, and slip agents. Mixtures of these additives can also be used with the present invention. These additives typically do not contribute to void formation as does the calcium carbonate because they have particle sizes that are too small.

The polymer films of the present invention can be used alone or in combinations with other materials to form labels and packaging materials. For example, in one embodiment, the present invention is a label including at least two layers wherein the first layer is a transparent layer having thereon printing and the second layer is an opaque polymer film of the present invention. In another embodiment, the present invention is a packaging material having at least two layers, one layer of which is an opaque polymer film of the present invention. The films of the present invention are useful in end uses such as soda bottles and food wrappers such as candy wrappers. These films can also be used as synthetic paper.

EXAMPLES

The following examples are provided to illustrate the present invention. The examples are not intended to limit the scope of the present invention and they should not be so interpreted. Amounts are in weight parts or weight percentages unless otherwise indicated.

Example 1

A 1000 micron cast sheet is prepared by admixing a 7 parts of a high crystalline polypropylene sold under the trade designation ATOFINA 3270 with 3 parts of a master batch consisting of 60 percent $CaCO_3$; 10 percent $TiO_2$; and 30 percent noncrystalline polypropylene. The resulting resin had a concentration of microvoid forming additive of 20 percent. The cast sheet is formed by feeding the resin through a 1¼ inch (3.2 cm) Welex® extruder using a 10 inch (25.4 cm) die.

The resultant cast sheet is then biaxially oriented to form an opaque film using a BRÜCKNER Karo IV laboratory orienter. The sheet is stretched 5×8 at 150° C. The opaque film is then tested for certain physical properties, and the results of the testing are displayed below in the table.

Comparative Example I

An opaque film is prepared substantially identically to Example 1 except that instead of a high crystalline polypropylene, a conventional polypropylene sold under the trade designation ATOFINA 3371 is used and the film is oriented at 145° C.

Comparative Example II

An opaque film is prepared substantially identically to Example 1 except that instead of a high crystalline polypropylene, an impact polypropylene copolymer sold under the trade designation ATOFINA 4320 is used and the film is oriented at 145° C.

Comments Regarding the Examples

Figure 2:
FIG. 2 is an SEM photomicrograph of a cross section of an opaque film prepared using an impact copolymer polypropylene resin.
Figure 3:
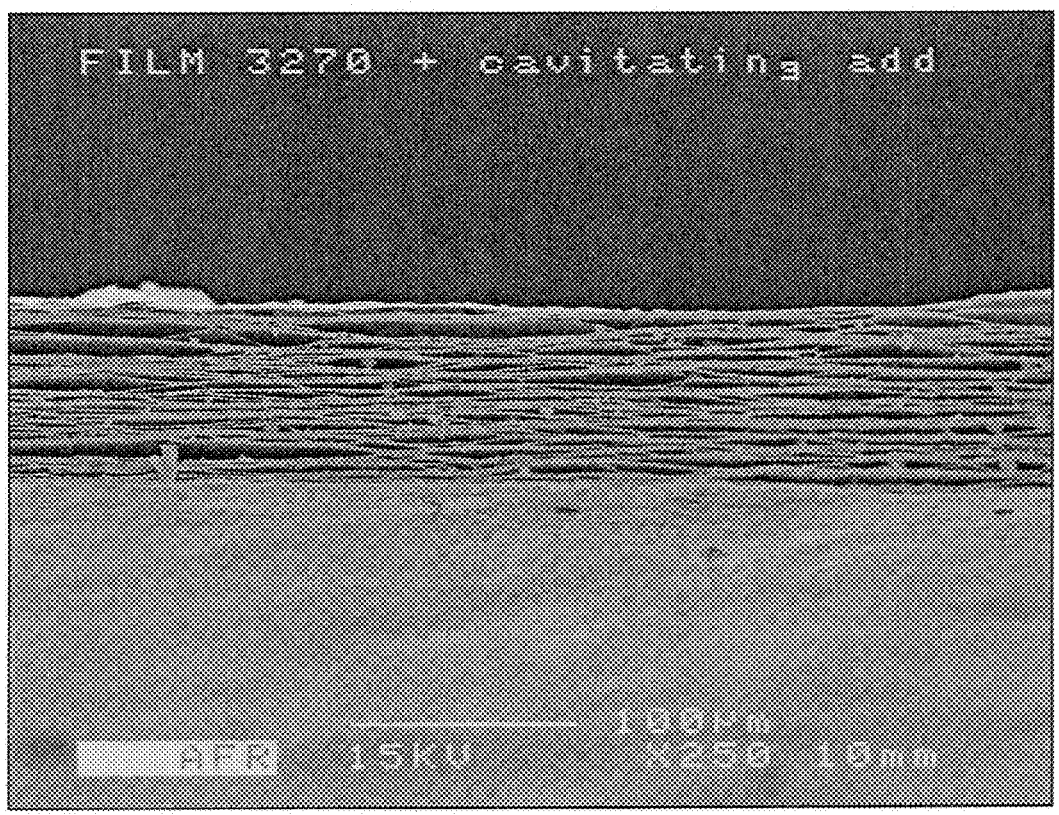
FIG. 3 is an SEM photomicrograph of a cross section of an opaque film of the present invention.
Figure 4:
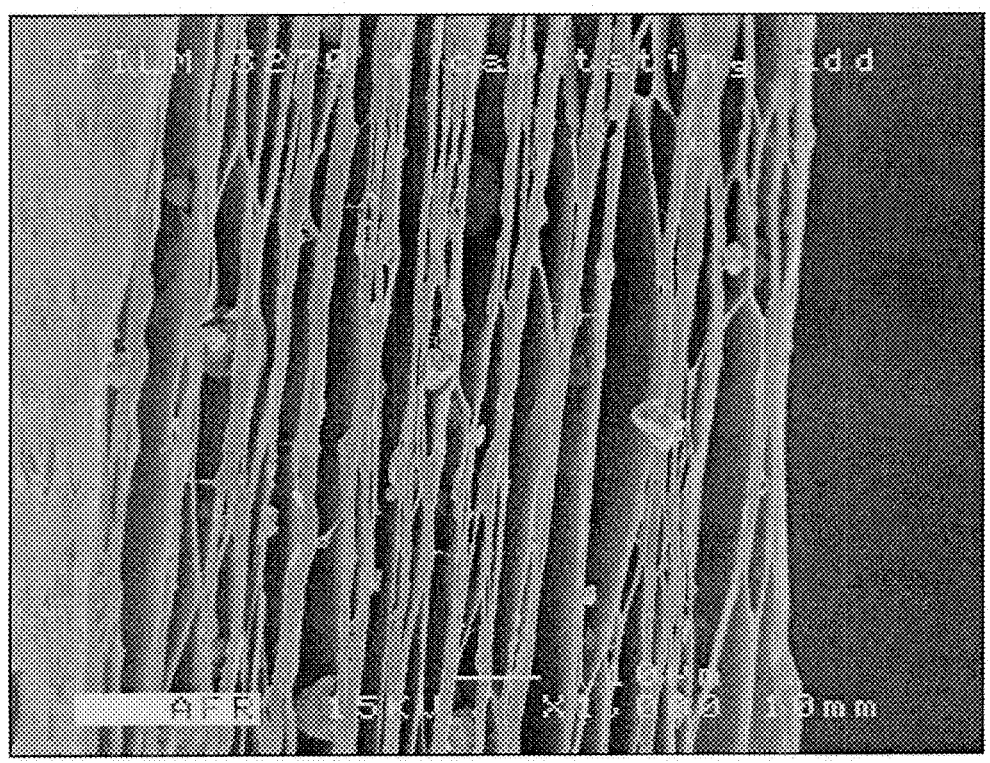
FIG. 4 is a higher resolution SEM photomicrograph of the same film as in FIG. 3.

As can be seen from the examples above, the films of the present invention are significantly more opaque and have a greater apparent toughness at the same loadings of the microvoid forming additive. The photomicrograph of the cross sections of the films and comparative examples shows the greater depth and breadth of the microvoids of the films of the present invention. An opaque film of the present invention can have substantially more microvoids than either conventional polypropylene or impact polypropylene copolymer as is shown in FIGS. 1-4.

TABLE

| Property | Units | Example 1 | Comparative Example I | Comparative Example II |
| --- | --- | --- | --- | --- |
| Density | g/cm³ | 0.51 | 0.64 | 0.61 |
| Thickness | micron | 45 | 38 | 40 |
| Light Transmittance[1] | percent | 19 | 32 | 27 |
| Whiteness[2] | percent | 91 | 87 | 88 |
| Gloss @45°[3] | percent | 44 | 21 | 17 |
| 1% Sec Modulus MD[4] | MPa | 1000 | 950 | 590 |
| 1% Sec Modulus TD[5] | MPa | 1900 | 1900 | 1300 |
| Tensile at Break MD[6] | MPa | 60 | 65 | 55 |
| Tensile at Break TD[7] | MPa | 120 | 130 | 110 |
| Elongation at Break MD[8] | percent | 70 | 90 | 70 |
| Elongation at Break TD[9] | percent | 15 | 20 | 20 |
| Water Vapor Transmission Rate[10] | g · 25.4μ/(m² · day) | 9.0 | 8.3 | 18.7 |
| Oxygen Transmission Rate[11] | cc · 25.4μ/(m² · day) | 4200 | 2400 | 9020 |

TABLE-continued

| Property | Units | Example 1 | Comparative Example I | Comparative Example II |
|---|---|---|---|---|
| Apparent Toughness[12] | MPa | 12.0 | 10.1 | 7.5 |

[1] ASTM D1003-00
[2] ASTM E313-00
[3] ASTM D2457-03
[4] ASTM D882-02
[5] ASTM D882-02
[6] ASTM D882-02
[7] ASTM D882-02
[8] ASTM D882-02
[9] ASTM D882-02
[10] ASTM F1249-01
[11] ASTM D3985-02e1
[12] Calculations of apparent toughness are based on the area under the stress-strain curve.

What is claimed is:

1. An opaque biaxially oriented polymer film comprising a high crystalline polypropylene having a heat of fusion of at least 70 joules/g and prepared using a metallocene catalyst, wherein the film has a thickness of less than 1.25 mil and wherein the film has a density of from about 0.44 to about 0.55 g/cm$^3$.

2. The opaque biaxially oriented polymer film of claim 1, wherein the high crystalline polypropylene exhibits a melting point of from about 155° C. to about 170° C.

3. The opaque biaxially oriented polymer film of claim 1, wherein the opaque biaxially oriented polymer film exhibits a light transmittance, measured according to ASTM D1003-00, of less than 80 percent.

4. The opaque biaxially oriented polymer film of claim 1, wherein the high crystalline polypropylene exhibits a recrystallization temperature of from about 105° C. to about 125° C.

5. The opaque biaxially oriented polymer film of claim 1, wherein the polymer film further comprises a pigment.

6. The opaque biaxially oriented polymer film of claim 5, wherein the pigment is $TiO_2$.

7. A label formed from the opaque biaxially oriented polymer film of claim 1.

* * * * *